United States Patent [19]

Duffield et al.

[11] Patent Number: 5,461,427
[45] Date of Patent: Oct. 24, 1995

[54] TELEVISION RECEIVER HAVING THE CAPABILITY TO ASSOCIATED AND HDTV AND AN NTSC CHANNEL

[75] Inventors: David J. Duffield, Indianapolis; Robert D. Altmanshofer, Carmel, both of Ind.

[73] Assignee: Thomson Consumer Electronics, Inc., Indianapolis, Ind.

[21] Appl. No.: 266,903

[22] Filed: Jun. 28, 1994

[51] Int. Cl.⁶ .......................... H04N 5/260; H04N 5/265
[52] U.S. Cl. .......................... 348/555; 348/556; 348/570; 348/732; 455/186.2
[58] Field of Search .................... 348/555, 554, 348/556, 570, 731, 732; 455/186.1, 186.2; H04N 5/260, 5/265

[56] References Cited

U.S. PATENT DOCUMENTS

| | | | |
|---|---|---|---|
| 4,605,950 | 8/1986 | Goldberg et al. | 358/11 |
| 4,670,783 | 6/1987 | Nadan | 358/141 |
| 4,694,338 | 9/1987 | Tsinberg | 358/141 |
| 4,914,517 | 4/1990 | Duffield | 348/732 |
| 4,959,720 | 9/1990 | Duffield et al. | 348/732 |
| 5,045,947 | 9/1991 | Beery | 348/732 |
| 5,083,205 | 1/1992 | Arai | 348/555 |
| 5,122,875 | 6/1992 | Raychaudhuri et al. | 358/133 |
| 5,134,464 | 7/1992 | Basile et al. | 358/12 |
| 5,148,272 | 9/1992 | Acampora et al. | 358/133 |
| 5,235,424 | 8/1993 | Wagner et al. | 358/174 |
| 5,253,067 | 10/1993 | Chaney et al. | 348/732 |
| 5,287,180 | 2/1994 | White | 348/484 |

OTHER PUBLICATIONS

U.S. Ser. No. 08/209,357, filed Mar. 14, 1994 in the name of Wang, et al., entitled Multiple QAM Digital Television Signal Decoder Sony, KW-3600HD.

*Primary Examiner*—James J. Groody
*Assistant Examiner*—Glenton B. Burgess
*Attorney, Agent, or Firm*—Joseph S. Tripoli; Peter M. Emanuel; Thomas F. Lenihan

[57] ABSTRACT

A television receiver system includes an HDTV tuner, and an NTSC tuner. In response to the entering of a channel number, a CHANNEL UP or CHANNEL DOWN command, or a channel label, in a channel selection mode, a controller searches a "paired channel" table for associated HDTV and NTSC channels. If an HDTV channel is associated with that channel number or channel label, the HDTV tuner is controlled to select the HDTV channel. If no HDTV channel is associated with that channel number or channel label, the NTSC tuner is controlled to select the corresponding NTSC channel. In another embodiment, the controller determines if HDTV signals are actually being received. If not, the controller causes the NTSC tuner to select the corresponding NTSC channel. In yet another embodiment, the "paired channel" data is sent via an Extended Data Services (EDS) transmission and automatically loaded into memory.

14 Claims, 6 Drawing Sheets

TELEVISION RECEIVER HAVING THE CAPABILITY TO ASSOCIATED AND HDTV AND AN NTSC CHANNEL

FIELD OF THE INVENTION

The subject invention concerns the field of television receivers, and relates specifically to a television receiver for tuning both NTSC (i.e., conventional) signals and HDTV (i.e., digital high definition widescreen) signals.

BACKGROUND OF THE INVENTION

The HDTV (digital high definition widescreen television) system proposed for use in the United States is totally incompatible with the NTSC broadcast standard in use today. Some primary differences between the two systems are: the HDTV system is digital while the NTSC system is analog, the HDTV system uses a 16:9 aspect ratio while the NTSC system has a 4:3 aspect ratio, the HDTV system will have 1125 television scan lines while the NTSC system has only 525. Thus, if the broadcasting industry immediately adopted the digital HDTV system and abandoned the NTSC system, perfectly serviceable NTSC television receivers purchased within the last few years would be rendered obsolete and useless. To avoid such a result, it is currently envisioned that the transition from conventional analog NTSC-standard broadcasts to digital HDTV television broadcasts will occur over a period which may last some fifteen years to allow for normal attrition of the older NTSC television receivers. During this period, television stations may "simulcast" (i.e., simultaneously broadcast) their programs on two television channels allotted for their use by the FCC (Federal Communications Commission). Each of the two channels will encompass 6 MHz of bandwidth, and need not be contiguous. One of the two channels will be the currently assigned analog NTSC channel, and the other will be assigned for transmission of HDTV material.

It is not expected that all television stations will begin broadcasting HDTV signals on the same day. Instead, the television stations in a given geographic area will most probably begin HDTV transmissions over a period of a few weeks, months, or even years, as their individual finances permit. It is envisioned that television receivers produced during the transition period will include both an HDTV tuner and signal processing section, and an NTSC tuner and signal processing section. In this way, the television receiver could receive and display signals of both systems.

As noted above, each television station in a given geographic area will have two channels assigned to it. It is most likely that these channels will not be contiguous, nor even have a nationwide pattern of channel pairing due to the realities of spectrum crowding. That is, there will be no fixed relationship the NTSC channel number and the HDTV channel number.

Nevertheless, despite that fact that the signals are carried on two distinct frequencies, and are actually incompatible, it is likely that the viewer will come to regard the transmissions as one television channel, because the same television program may be carried simultaneously on both channels. That is, a version of a given television program in the NTSC format may be aired on the NTSC channel at the same time that its corresponding version in the HDTV format is aired on the paired HDTV channel of the same television station. The nontechnical viewer, not fully understanding the system distinctions, will naturally expect to tune his desired television program with a single selection, just as he has done in the past.

In order to free the viewer from having to remember that NTSC channel 4 (for example) is paired with HDTV channel 41 (for example), a tuning-setup procedure will be provided so that the viewer may specify which channels are paired in his given geographic area.

A dual-system (i.e., High Definition TV/NTSC) television receiver is known from the Sony KW-3600HD television receiver, produced and marketed in Japan by Sony Corporation in 1990. The KW-3600HD includes circuitry to receive and display NTSC signals and High Definition analog signals (i.e., the MUSE system). It is noted that in Japan there are only two MUSE channels, and consequently, they are not "paired" with a corresponding NTSC channel.

It is known from U.S. Pat. No. 4,600,918 (Bellisomi et al.), and also from U.S. Pat. No. 4,959,720 (Duffield, et al.), to associate a label (e.g., WNBC) with a channel number, and thereafter, tune the desired channel by entering its label. However, as noted above, viewers will likely come to regard the HDTV and NTSC broadcasts which are transmitted from the same station as a single channel, and therefore the viewer will expect each station to have only one label (i.e., WTTV). Thus, a problem exists in how to perform a tune-by-label function in a combined HDTV-compatible and NTSC-compatible television receiver when at least some television stations have both an NTSC channel and an HDTV channel assigned to them.

SUMMARY OF THE INVENTION

A television receiver system includes a first tuner and signal processing arrangement for receiving and processing television signals in the HDTV format, and a second tuner and signal processing arrangement for receiving and processing television signals in the NTSC format. The television receiver includes a controller responsive to user input for associating a pair of television channels, one being an NTSC-signal carrying channel, and the other being an HDTV-signal carrying channel. In response to a channel selection, a controller searches a table for those channels which are associated with that particular channel number. If an HDTV channel is associated with that number, the HDTV tuner is controlled to select the HDTV channel. If no HDTV channel is associated with that number, the NTSC tuner is controlled to select the corresponding NTSC channel.

In a second embodiment of the invention, the television receiver includes a controller responsive to user input for associating a single label with a pair of television channels, one being an NTSC-signal carrying channel, and the other being an HDTV-signal carrying channel. In response to a channel selection via the label, a controller searches a table for those channels which are associated with that particular label. If an HDTV channel is associated with that label, the HDTV tuner is controlled to select the HDTV channel. If no HDTV channel is associated with that label, the NTSC tuner is controlled to select the corresponding NTSC channel.

In yet another embodiment of the invention, if an HDTV channel is associated with a label entered for channel selection, the controller determines if HDTV signals are actually being received. If so, the controller causes the HDTV tuner to select the HDTV channel, and if not, the controller causes the NTSC tuner to select the corresponding NTSC channel.

In yet another embodiment of the invention, data relating to paired NTSC and HDTV channels is communicated via Extended Data Services (EDS) signals transmitted by a broadcaster during the vertical interval and automatically loaded into the proper areas of RAM in the receiver.

DETAILED DESCRIPTION OF THE EMBODIMENT

Figure 1:
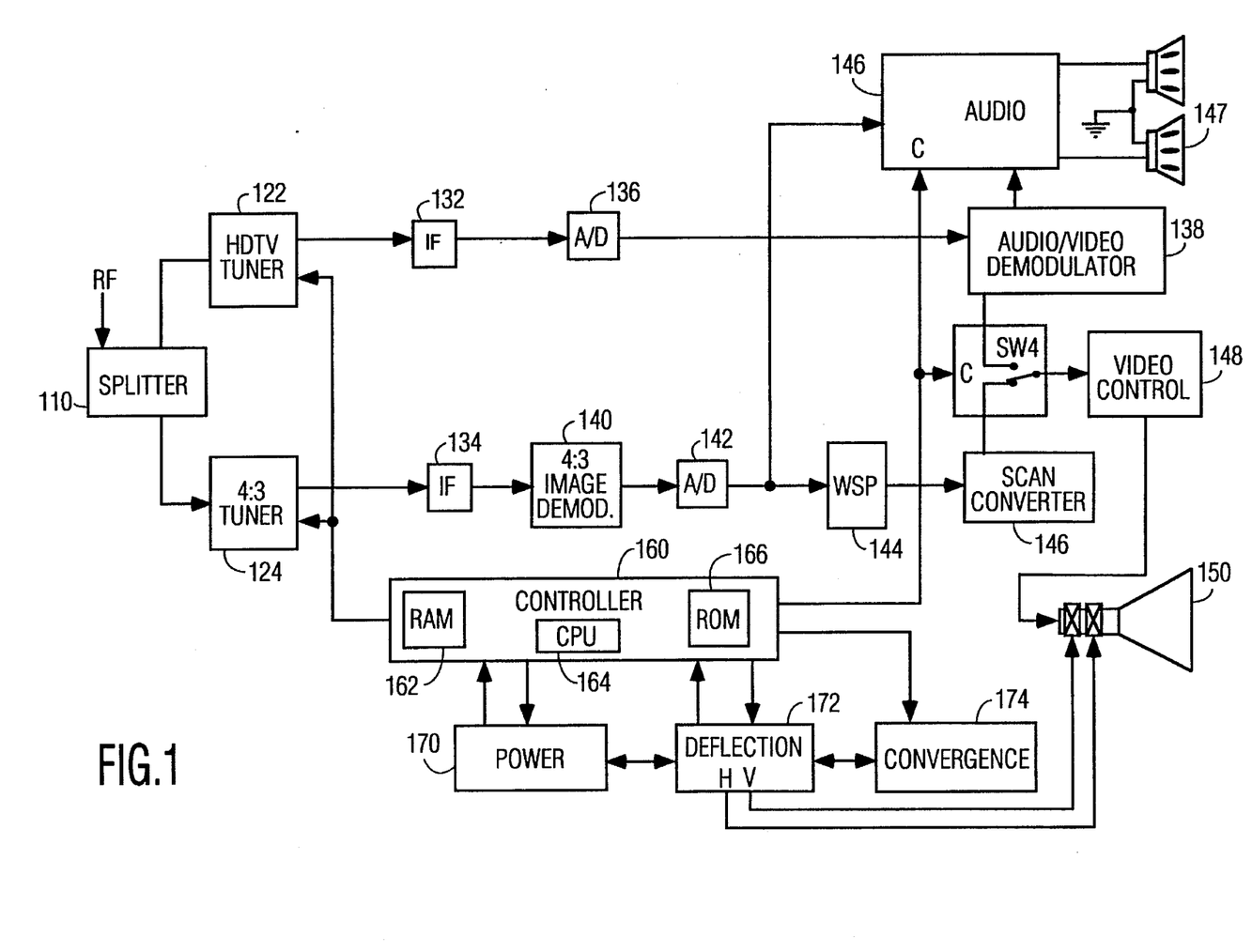
FIG. 1 shows a simplified block diagram of a television receiver suitable for use with the invention.
Figure 2A:
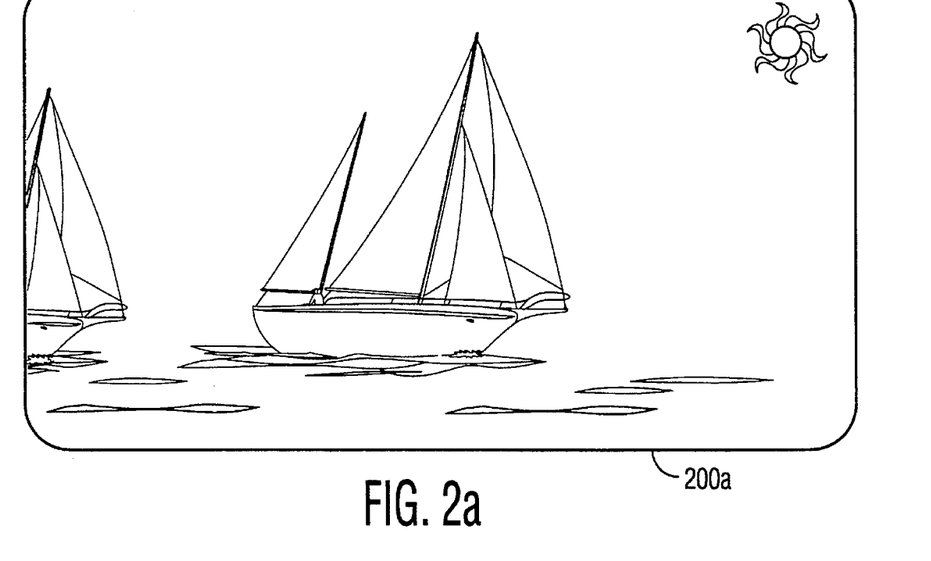
FIGS. 2a and 2b show 16:9 display screens having screen displays useful in understanding the invention.
Figure 2B:
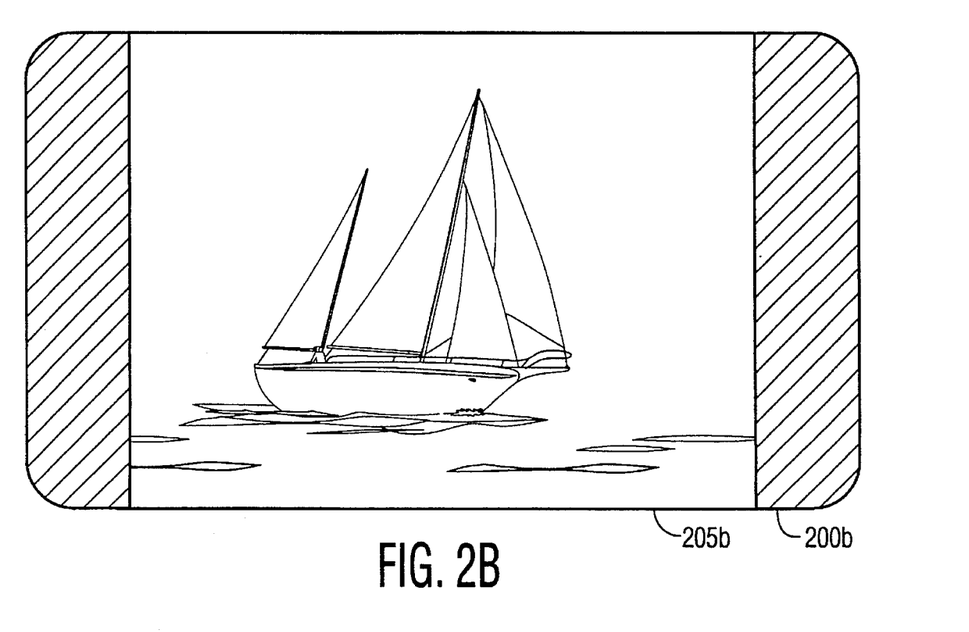

FIG. 1 shows in block diagram form, the circuitry of a dual system television which receives and processes television signals transmitted in both HDTV format and in a conventional format such as NTSC. Such a receiver is equipped with a widescreen picture tube for displaying HDTV television images in the 16:9 aspect ratio. The receiver of FIG. 1 also includes an NTSC signal path which is capable of processing signals in only the conventional 4:3 aspect ratio. This arrangement is advantageous in that it makes use of the NTSC tuner when no HDTV signal is available for viewing. The images produced in such a receiver are shown in FIGS. 2a and 2b. Note that the image 200a of FIG. 2a is different from the image 205b of FIG. 2b. In FIG. 2a, the image is a 16:9 widescreen HDTV image, and in FIG. 2b the image is a 4:3 conventional (i.e., NTSC, PAL or SECAM) image from a "paired" NTSC channel. A side panel area 200b does not contain picture information and may be illuminated with 30% luminance signal to reduce uneven picture tube degradation.

With foregoing in mind, the apparatus of FIG. 1, for carrying out the invention, will now be described. RF signals are applied to the input of a signal splitter 110. RF signals from a first output of signal splitter 110 are applied to an HDTV tuner 122. Splitter 110 also provides RF signals to a 4:3 (e.g., NTSC) tuner 124. Both of the above-mentioned tuners are controlled by a controller 160. Controller 160, includes a RAM (Random Access Memory) 162, a CPU (Central Processing Unit) 164, and a ROM (Read Only Memory) 166. Controller 160 may be a microcomputer, a microprocessor, or a dedicated custom integrated circuit controller. RAM 162 and ROM 166 may be either internal or external to controller 160. Controller 160 also controls other portions of the television receiver which are not particularly relevant to the subject invention, such as a power unit 170, a deflection unit 172, and a convergence assembly 174.

HDTV tuner 122 may be of the type known from U.S. Pat. No. 5,235,424, (Wagner, et al.) issued 10 Aug. 1993, hereby incorporated by reference. HDTV tuner 122, and 4:3 (e.g., NTSC) tuner 124 convert their respective received RF signals to an intermediate frequency (IF) and apply the IF signal to a respective IF amplifier 132, or 134. HDTV IF unit 132 amplifies the signals presented to it, and applies an amplified IF signal to an A/D (analog-to-digital) converter 136. A/D unit 136 converts the IF signal from the analog domain to the digital domain, and applies the resulting digital signals to an AUDIO/VIDEO DEMODULATOR unit 138. Those skilled in the art will recognize that AUDIO/VIDEO DEMODULATOR unit 138 includes such known sub-blocks as an equalizer, and a transport unit, not shown or discussed in detail because those sub-blocks are not particularly germane to the subject invention. AUDIO/VIDEO DEMODULATOR unit 138 separates video and audio signals, provides video signals to a first input of a video switch SW4, and provides audio signals to one input of an AUDIO amplifier block 146, which demodulates stereo audio signals, amplifies the signals and applies them to a pair of speakers 147.

4:3 picture IF unit 134 is connected to the input of a 4:3 IMAGE DEMODULATOR 140 which converts the IF signal to a baseband 4:3 video signal and applies it to an A/D converter unit 142 for digital conversion. The resulting digital signal is provided to a Wide Screen Processor (WSP) unit 144 which converts the received 4:3 NTSC signal into the 16:9 format. The output of Wide Screen Processor (WSP) unit 144 is applied to a SCAN CONVERTER unit 146 for conversion to HDTV scan rates.

The output of SCAN CONVERTER unit 146 is applied to one input of video switch SW4. Switch SW4 operates under control of controller 160, and selects one of the two signals at its inputs for application to VIDEO CONTROL unit 148 for amplification. VIDEO CONTROL unit 148 applies the amplified signal to the input terminals of a display device 150. Of course, display device 150 may be a picture tube, a set of projection tubes, or an LCD (Liquid crystal display) device.

AUDIO unit 146 operates under control of controller 160, and includes audio selection circuitry for selecting the proper audio signal which accompanies the main image. In this regard, AUDIO unit 146 has a second input for receiving AUDIO signals associated with the NTSC signal from A/D unit 142.

POWER SUPPLY, unit 170, includes both standby and operating power supplies. DEFLECTION unit 172 provides horizontal (H) and vertical (V) deflection signals, and CONVERGENCE unit 174 controls proper registration of the R, G, and B, color signals on display device 150.

The operation of a "tune-the-associated-channel" feature according the subject invention will be described with reference to FIGS. 2a and 2b, the flowchart of FIG. 3, and the memory arrangement of FIG. 4. In FIG. 2a, a 16:9 HDTV image of a yacht race 200a is received and displayed, and in FIG. 2b, a 4:3 NTSC image of the same yacht race 205b is received from the paired NTSC channel and displayed.

Figure 3:
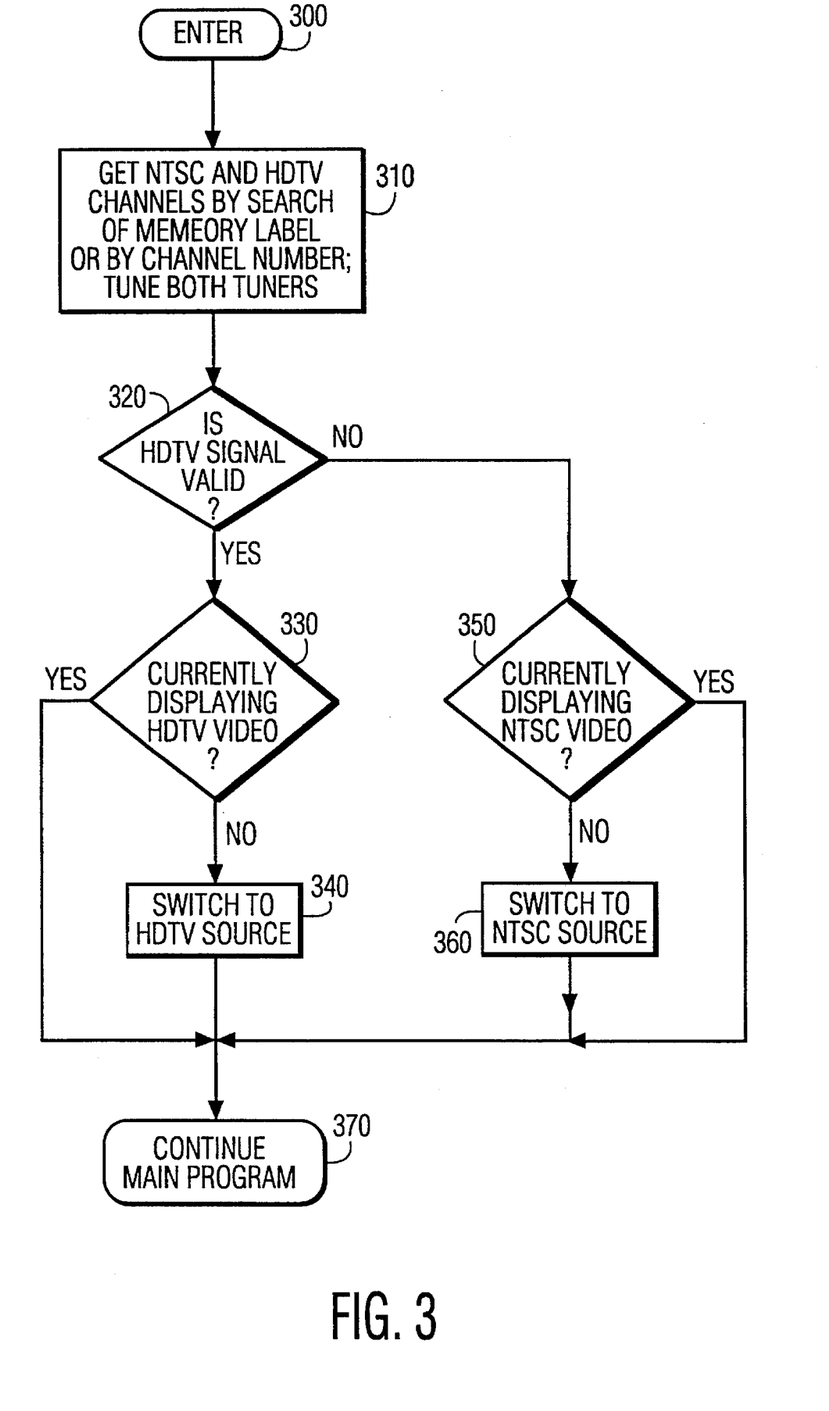
FIG. 3 is a flowchart showing the relevant portion of the control program for the controller of FIG. 1.

The "tune-the-associated-channel" function is accomplished by use of that portion of the control program of controller 160 which is illustrated in FIG. 3, which will be described in detail below.

Figure 4:
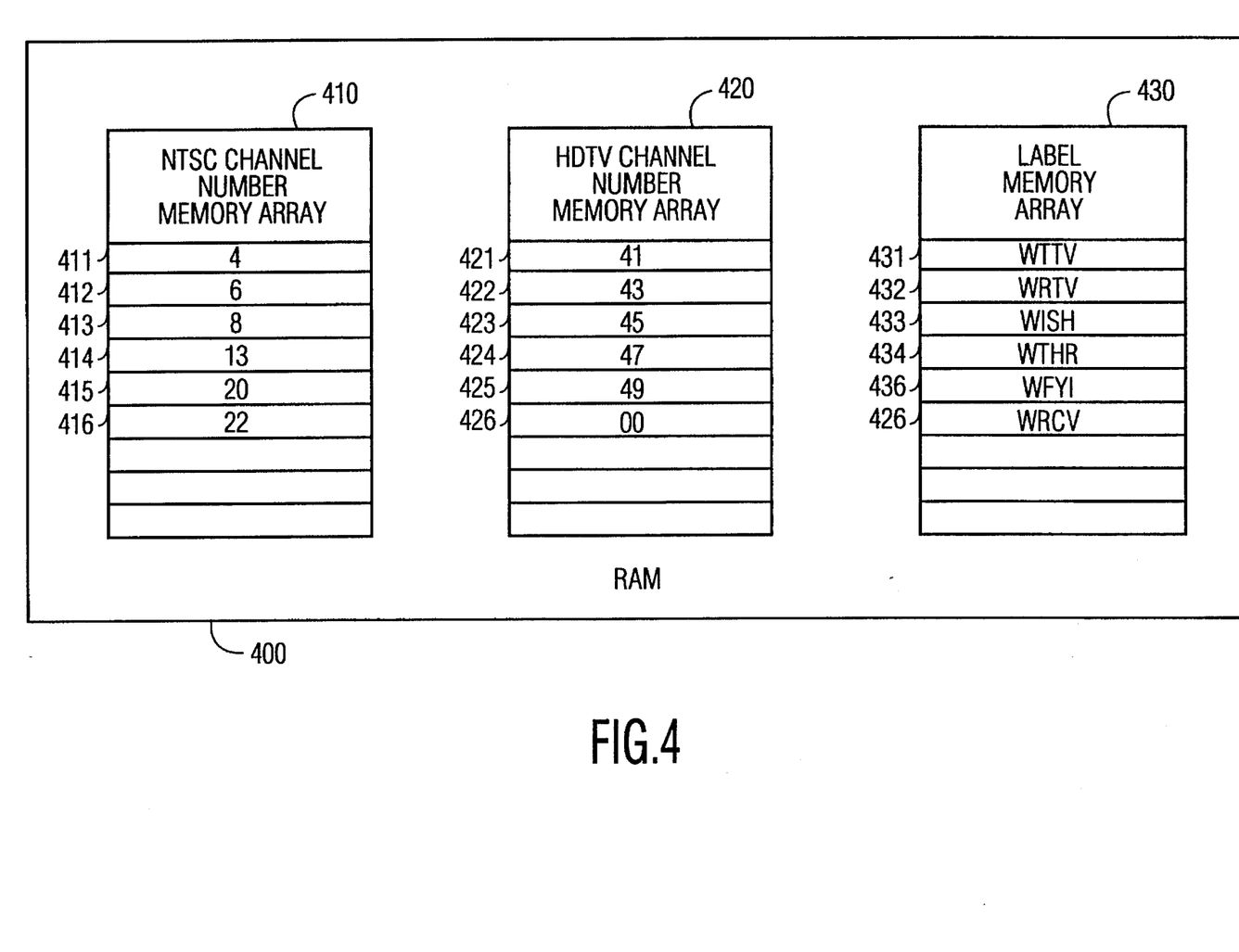
FIG. 4 is a simplified illustration of a portion of the memory arrangement of the controller of FIG. 1.

Turning for a moment to FIG. 4, a memory array 400 is shown comprising three portions 410–430. Portion 410 stores in locations 411–416 NTSC channel numbers entered by a user either directly or via an autoprogramming mode. Portion 420 stores in locations 421–426 HDTV channel numbers entered by a user. A further portion 430 stores in locations 431–436 labels entered by a user directly or selected from a menu, and used in a "tune-by-common-label" embodiment of the invention. The labels and channel numbers may be stored such that, for example, the label stored in location 431 is associated with both the HDTV channel number stored in location 421, and the NTSC channel number stored in location 411. Note that location 426 contains the code 00, a nonexistent channel number, indicating that NTSC channel 22 has no paired HDTV channel at this time. The above-described memory array is only one of many programming techniques which may be used to associate a label with an NTSC channel and an HDTV channel, others may be variations of tree structures, or simply pointers to specific areas where the data may be found. The invention is not intended to be limited to the type of data structure used.

Returning to the flowchart of FIG. 3, step 300 is entered upon receiving a channel change command or a tune-by-label command from a remote control unit (not shown). Assuming for purposes of explanation that the user-entered channel number is NTSC channel 8, that channel number will be found at memory location 413, and a search is made of memory to find its corresponding HDTV channel number (Step 310). In this case it will be found that NTSC channel 8 (from location 413) corresponds to HDTV channel 45 (from location 423). Alternatively, the user may enter a channel label. Assuming for purposes of explanation that the user-entered label is WISH, that label will be found at memory location 433, and a search is made of memory to find its corresponding HDTV and NTSC channel numbers (Step 310). In this case it will be found that the corresponding channel numbers are HDTV channel 45 (from location 423) and NTSC channel 8 (from location 413), as noted above. Using these channel numbers both the NTSC and HDTV tuners are tuned to the proper channels. At step 320, the signal from HDTV tuner 122 is examined to determine if a valid HDTV signal is present. If, at step 320, the HDTV signal was not valid, then the NO path is taken to step 350 wherein a check is made to see if NTSC video is currently being displayed. If so, nothing more needs to be done, and the routine is exited at step 370. If, however, an HDTV signal is unavailable but NTSC video is not being displayed, then switch SW4 is controlled to select NTSC video for display (step 360). If, at step 320, the HDTV signal was valid, then the YES path is taken to step 330. At step 330, controller 160 determines if HDTV video is currently being displayed. If so, then nothing more needs to be done and the routine is exited at step 370. If, however, HDTV video is available for viewing and HDTV signals are not currently selected, then switch SW4 is controlled to select HDTV video for viewing (step 340). In the event that there is no paired HDTV channel, then the HDTV signal at step 320 would not be valid, and switch SW4 would be switched to select NTSC signals. Alternatively, the routine could simply advance directly to step 360 in the absence of HDTV channel data.

It is important to note that in the above-described system, HDTV signals are preferred. That is, the receiver will first attempt to tune to the HDTV channel associated with an entered channel number or channel change command. In the case of an entered label, the receiver will first attempt to tune to an HDTV channel associated with a given label, rather than to an NTSC channel also associated with that label. The receiver will default to the NTSC channel on only two conditions. First, when there is no HDTV channel associated with a particular label, and second, when there is no valid HDTV signal at the desired HDTV channel.

It is also envisioned that the receiver may operate as follows. The entering of an NTSC channel number causes the selection of that NTSC channel. The entering of an HDTV channel number causes the selection of that HDTV channel, if it is available, and the selection of the corresponding NTSC channel, if the requested HDTV channel is not available. The entering of a CHANNEL UP or a CHANNEL DOWN command causes the selection of the HDTV channel corresponding to the next NTSC channel in the NTSC preferred channel list, if it is available, and the selection of the NTSC channel from the NTSC preferred channel list, if the HDTV channel is not available.

It is further envisioned that the receiver may make use of the Extended Data Services (EDS) signal in the following way. If a "flag bit" is added to the EDS signal whenever an NTSC channel has an active "paired" HDTV channel, then a channel change command by either a direct entering of a channel number, or by the entering of a CHANNEL UP or a CHANNEL DOWN command, causes the selection of the HDTV channel corresponding to the next NTSC channel in the NTSC preferred channel list. If the EDS "HDTV active" flag indicates that no counterpart HDTV channel is available, then the NTSC channel is selected. Thus, the decision of which of HDTV or NTSC is to be selected is determined by the state of the EDS "HDTV active" flag bit.

If the flowchart of FIG. 3 is entered at step 320 periodically when no label or channel change command is received, then the receiver will automatically switch to NTSC reception of the corresponding "paired" NTSC channel in the event that the currently-tuned HDTV channel stops broadcasting HDTV signals. This mode of operation is advantageous because, as noted above, when HDTV broadcasting begins, not enough HDTV programming may exist to support continuous broadcasting of HDTV signals.

Figure 5A:
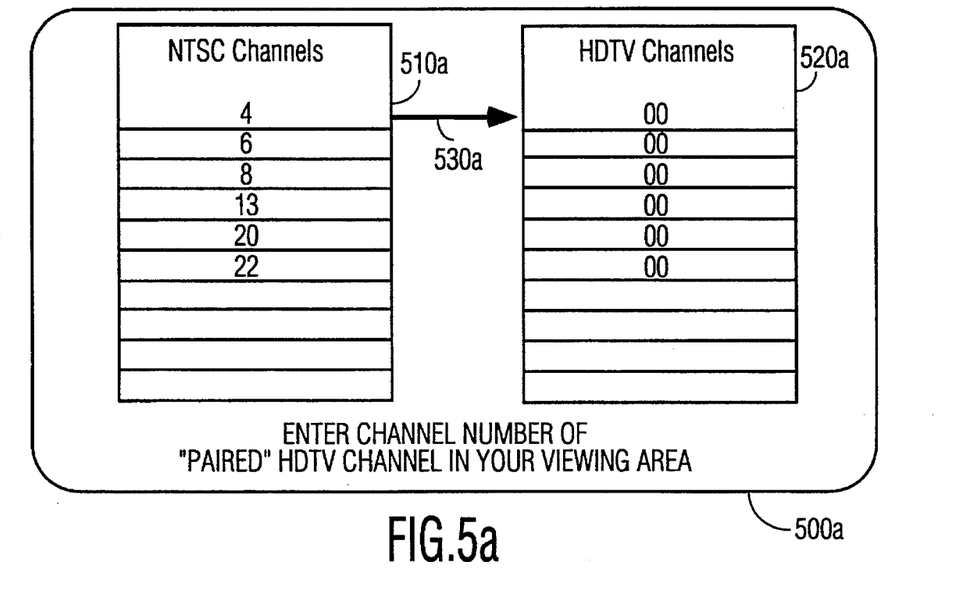
FIGS. 5a and 5b are illustrations of a 16:9 display screen showing a list for entering channel pairing information.
Figure 5B:
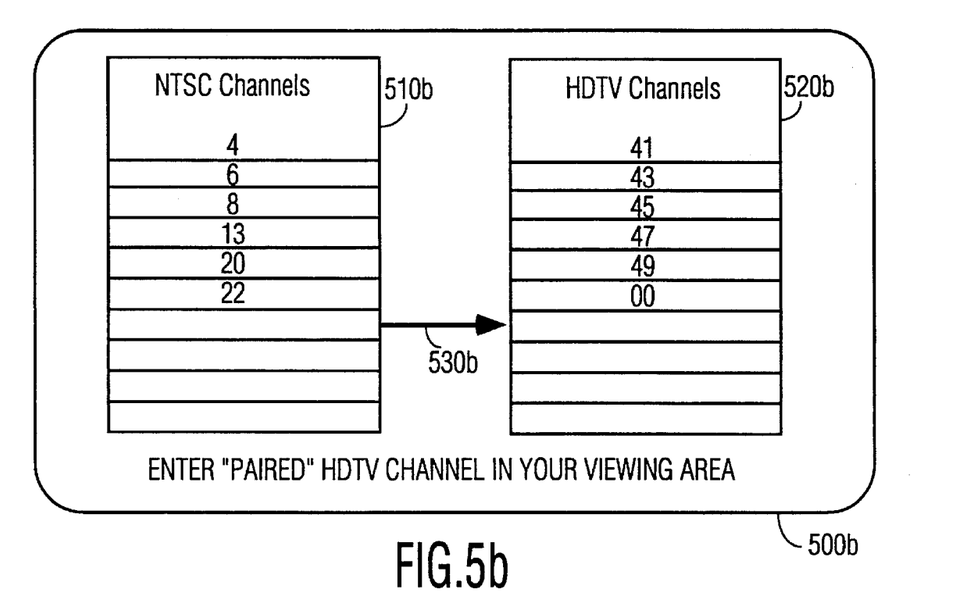

FIGS. 5a and 5b show a list for entering the data associating NTSC channels with counterpart HDTV channels. In FIG. 5a a display screen 500a shows an NTSC channel list 510a and an HDTV channel list 520a. The NTSC channel list 500a includes channel data which may have been automatically entered via an autoprogramming function. The HDTV channel list is empty of useful channel information, containing only the code 00 in each location. A cursor 530a, in combination with the text message at the bottom of the screen, indicates that the user is to enter the HDTV channel number for the HDTV channel in his local viewing area which corresponds to NTSC channel 4. Thus, FIG. 5a illustrates the way the lists would look when the user begins his initial setup procedure, and FIG. 5b shows the way the lists would look when the user has finished entering the data for corresponding HDTV channels. Note that the HDTV list location corresponding to NTSC channel 22 still contains the code 00 indicating that channel 22 in this example has no corresponding HDTV "paired" channel. Elements of FIG. 5b having similar reference numerals to those of FIG. 5a serve the same purpose and will not be described again.

Figure 6:
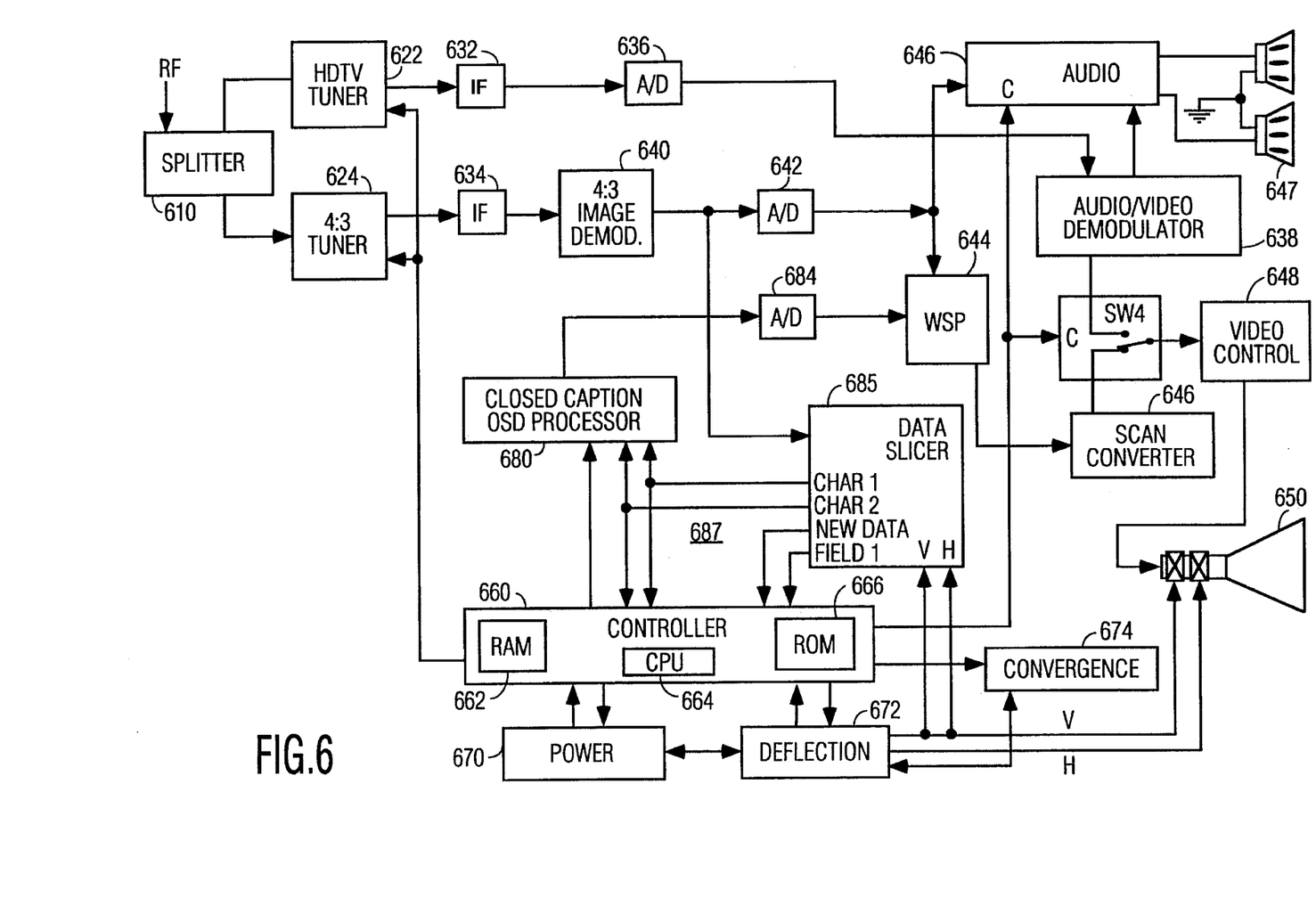
FIG. 6 shows a simplified block diagram of a television receiver suitable for use with another embodiment of the invention.

Alternatively, the "paired channel" data can be sent via an auxiliary signal, known as the Extended Data Services (EDS) signal, now being transmitted during the vertical interval of some television programs, and can automatically be loaded into memory. Apparatus for accomplishing this task is shown in FIG. 6. Elements in FIG. 6 bearing similar reference numerals to elements of FIG. 1 serve the same function and will not be described again. Referring to FIG. 6, a DATA SLICER unit 685 receives a composite video signal including closed caption or EDS data from demodulator 640. Data slicer 685 separates the EDS data from the video signal and supplies it to controller 660 and a Closed Caption OSD Processor unit 680 via a conductor array, generally designated 687. Output signals of Closed Caption OSD Processor unit 680 are applied via A/D converter unit 684 to Wide Screen Processor (WSP) unit 644 for display on the display screen of the receiver. EDS data concerning paired HDTV and NTSC channels are identified by controller 660 and loaded into the appropriate tables in RAM 440. In this way the user is relieved of the task of entering the corresponding HDTV channel numbers during a setup procedure.

The term "controller", as used herein, is intended to include microprocessors, microcomputers, dedicated control integrated circuits, and the like. The term "television receiver" is intended to encompass television receivers having a display device (commonly called "television sets"), and television receivers not having a display device (such as VCRs).

Although NTSC format signals are explicitly mentioned in the examples in the specification, the subject invention is also equally applicable to PAL or SECAM format television signals, and the term "conventional television signals", as used herein, is intended to include all television signals systems currently used to produce a 4:3 aspect ratio image.

What is claimed is:

1. A television receiver, comprising:

a conventional tuner and signal processing arrangement for receiving and processing television signals in a conventional format;

an HDTV tuner and signal processing arrangement for receiving and processing television signals in an HDTV format;

user-operable data input circuitry adapted to receive user-entered data or commands;

a controller responsive to user-entered data or commands for generating control signals;

memory circuitry for storing data indicative of an association of a television channel broadcasting in said HDTV format and a television channel broadcasting in said conventional format; and a switch having a first input coupled to receive conventional video signals and a second input coupled to receive HDTV video signals, said switch selecting either said HDTV video signals or said conventional video signals under control of said controller;

said controller, in response to the entering of a channel change command, searches said memory circuitry, and retrieves a channel number of said television channel broadcasting in said HDTV format and a channel number of said television channel broadcasting in said conventional format, said controller causing said HDTV tuner and said conventional tuner to tune to their respective channels in accordance with said retrieved channel numbers;

said controller causing said switch to select said HDTV video signals for viewing in response to a determination that a valid HDTV signal is present, and causing said switch to select said conventional video signals for viewing in response to a determination that said valid HDTV signal is not present.

2. The television receiver of claim 1 wherein, said conventional tuner is an NTSC tuner.

3. The television receiver of claim 1 wherein, said conventional tuner is a PAL tuner.

4. The television receiver of claim 1 wherein, said conventional tuner is a SECAM tuner.

5. A television receiver, comprising:

a conventional tuner and signal processing arrangement for receiving and processing television signals in a conventional format;

an HDTV tuner and signal processing arrangement for receiving and processing television signals in an HDTV format;

user-operable data input circuitry adapted to receive user-entered data or commands;

a controller responsive to user-entered data or commands for generating control signals;

memory circuitry for storing a data indicative of a label associated with a television channel broadcasting in said HDTV format and a television channel broadcasting in said conventional format; and a switch for selecting conventional video signals at a first input or HDTV video signals at a second input under control of said controller;

said controller, in response to the entering of said label, searches said memory circuitry, and retrieves a channel number of said television channel broadcasting in said HDTV format and a channel number of said television channel broadcasting in said conventional format, said controller causing said HDTV tuner and said conventional tuner to tune to their respective channels in accordance with said retrieved channel numbers;

said controller causing said switch to select said HDTV video signals for viewing in response to a determination that a valid HDTV signal is present, and causing said switch to select said conventional video signals for viewing in response to a determination that said valid HDTV signal is not present.

6. The television receiver of claim 5 wherein, conventional tuner is an NTSC tuner.

7. The television receiver of claim 5 wherein, said conventional tuner is a PAL tuner.

8. The television receiver of claim 5 wherein, said conventional tuner is a SECAM tuner.

9. A television receiver, comprising:

a conventional tuner and signal processing arrangement for receiving and processing television signals in a conventional format;

an HDTV tuner and signal processing arrangement for receiving and processing television signals in an HDTV format;

user-operable data input circuitry adapted to receive user-entered data or commands;

a controller responsive to user-entered data or commands for generating control signals;

memory circuitry for storing channel-related data for a television channel broadcasting in said HDTV format and a television channel broadcasting in said conventional format; and a switch for selecting conventional video signals at a first input or HDTV video signals at a second input under control of said controller;

said controller causing said switch to select said conventional video signals for viewing in response to a determination that a valid HDTV signal is not present.

10. The television receiver of claim 9 wherein, said conventional tuner is an NTSC tuner.

11. The television receiver of claim 9 wherein, said conventional tuner is a PAL tuner.

12. The television receiver of claim 9 wherein, said conventional tuner is a SECAM tuner.

13. A television receiver, comprising:

a conventional tuner and signal processing arrangement for receiving and processing television signals in a conventional format;

an HDTV tuner and signal processing arrangement for receiving and processing television signals in an HDTV format;

user-operable data input circuitry adapted to receive user-entered data or commands;

a controller responsive to user-entered data or commands for generating control signals;

memory circuitry for storing data indicative of a label associated with a television channel broadcasting in said HDTV format or data indicative of no television channel broadcasting in said HDTV format being associated with said label, and data indicative of a television channel broadcasting in said conventional format being associated with said label; and a switch for selecting conventional video signals at a first input or HDTV video signals at a second input under control of said controller;

said controller, in response to the entering of said label, searches said memory circuitry, and retrieves a channel number of said television channel broadcasting in said conventional format and causes said conventional tuner to tune to a channel in accordance with said retrieved channel number;

said controller causing said switch to select conventional video signals for viewing in response to a determination that said memory contains said data indicative of no television channel broadcasting in said HDTV format being associated with said label.

14. A television receiver, comprising:

a conventional tuner and signal processing arrangement for receiving and processing television signals in a conventional format;

an HDTV tuner and signal processing arrangement for receiving and processing television signals in an HDTV format;

user-operable data input circuitry adapted to receive user-entered data or commands;

a controller responsive to user-entered data or commands for generating control signals;

memory circuitry for storing data indicative of the association of a television channel broadcasting in said HDTV format and a television channel broadcasting in said conventional format;

circuitry for receiving and processing auxiliary data transmitted during synchronizing portions of said conventional television signals, data being indicative of the availability of an associated HDTV channel; and a switch having a first input coupled to receive conventional video signals and a second input coupled to receive HDTV video signals, said switch selecting either said HDTV video signals or said conventional video signals under control of said controller;

said controller, in response to the entering of a channel change command and in response to said auxiliary data indicating availability of an associated HDTV channel, searches said memory circuitry, and retrieves a channel number of said television channel broadcasting in said HDTV format, said controller causing said switch to select said HDTV video signals for viewing;

said controller, in response to the entering of a channel change command and in response to said auxiliary data indicating nonavailability of an associated HDTV channel, causes said switch to select said conventional video signals for viewing.

* * * * *